United States [11] 3,582,188

[72] Inventors Ben W. Rau
320 N. Deere Park, West, Highland Park, Ill. 60035;
Rokujiro Kato, 16, 3-chome, Minamiurawa, Urawa, Saitama Prefecture, Japan
[21] Appl. No. 836,061
[22] Filed June 24, 1969
[45] Patented June 1, 1971

[54] ZOOM MAGNIFIER
9 Claims, 7 Drawing Figs.
[52] U.S. Cl.......................................... 350/186, 350/187, 350/214
[51] Int. Cl...................................... G02b 7/10, G02b 15/14
[50] Field of Search............................................ 350/184, 186, 187

[56] References Cited
UNITED STATES PATENTS

| | | | |
|---|---|---|---|
| 2,566,485 | 9/1951 | Cuvillier........................ | 350/187X |
| 2,959,101 | 11/1960 | Sandback et al.............. | 350/187X |
| 3,399,015 | 8/1968 | Jacobs........................... | 350/187 |

*Primary Examiner*—John K. Corbin
*Attorney*—Dominik, Knechtel & Godula

ABSTRACT: A zoom tube type magnifier which includes, generally, eight lenses which are retained within a housing having means for adjustably positioning certain ones of said lenses with respect to one another in a fashion such as to provide a continuously variable 4.5—9 power magnifier. Three of the eight lenses of the magnifier have planosurfaces, and only one doublet is used, hence the magnifier can be easily and inexpensively manufactured. One of the lenses also is adapted to be adjustably positioned to focus the magnifier to accommodate the eye of the user and, once the magnifier is focused, it need not be readjusted when varying its magnification power between its 4.5—9 power range limit.

PATENTED JUN 1 1971

INVENTORS
BEN W. RAU
BY ROKUJIRO KATO

Dominik, Knechtel & Godula
ATTYS.

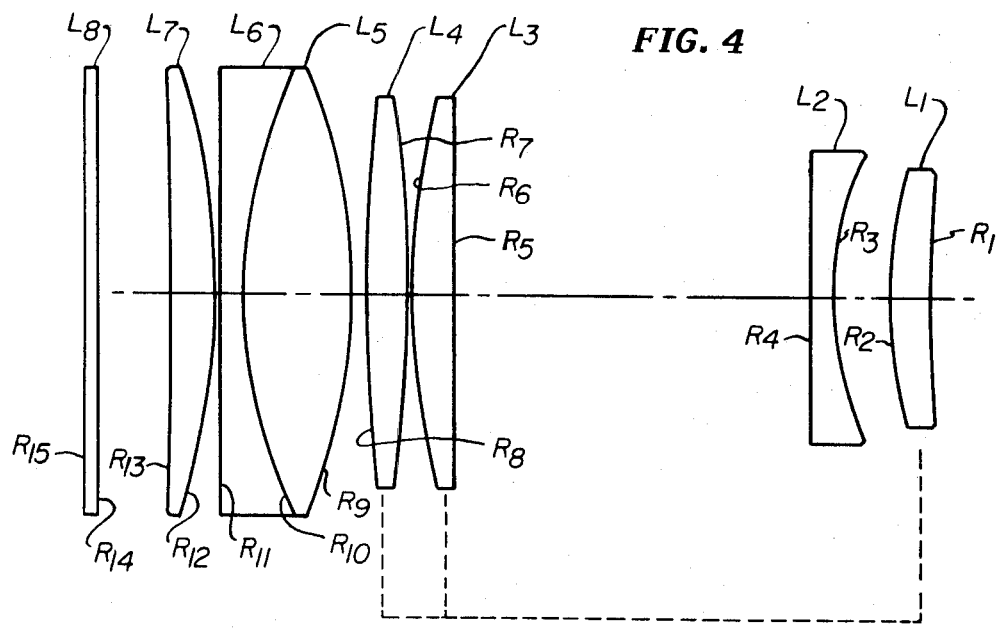
FIG. 4
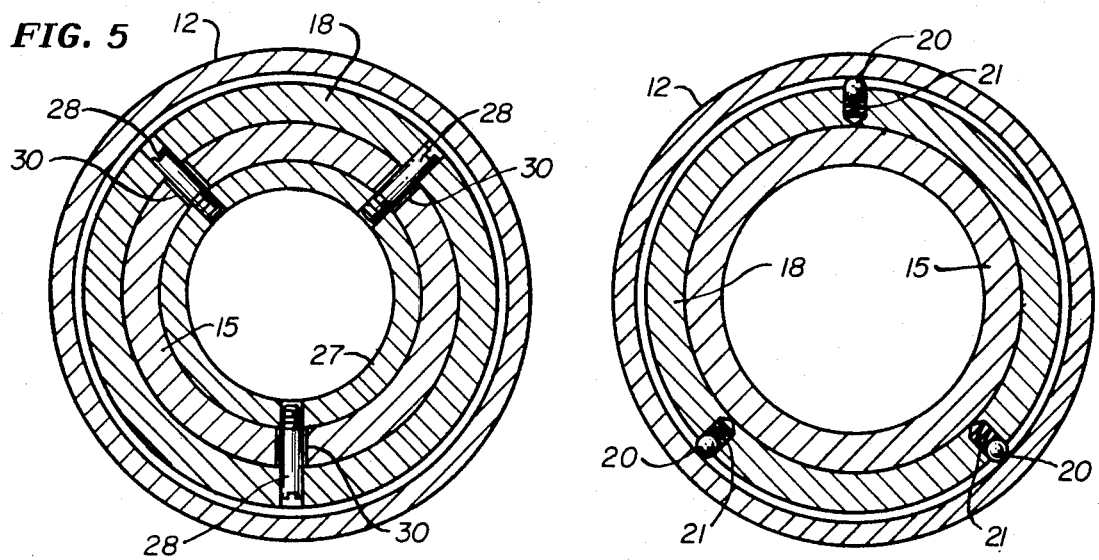
FIG. 5
FIG. 6
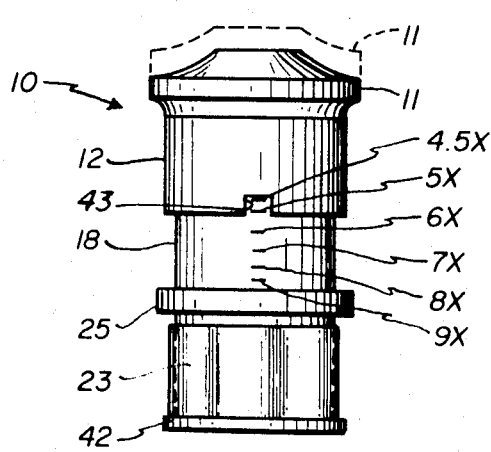
FIG. 7
INVENTORS
BEN W. RAU
ROKUJIRO KATO
BY Dominik, Knechtel & Godula
ATTYS

ZOOM MAGNIFIER

This invention relates to improved zoom tube magnifiers.

An object of the invention is to provide improved zoom tube type magnifiers which are compact and which are of a design such as to provide greater economy in manufacture than heretofore generally possible.

Another object is to provide improved zoom tube type magnifiers of a design such that the clarity of the image is substantially improved over similar comparable magnifiers.

A still further object is to provide improved zoom tube type magnifiers employing no more, and in most cases, fewer optical elements than available, similar, comparable magnifiers.

Still another object is to provide improved zoom tube type magnifiers which are adapted to the employment of a number of planosurfaces, thereby inherently reducing production costs.

Another object is to provide improved zoom tube type magnifiers which are adapted to be focused to accommodate the eye of the individual using them, and once focused, need not be readjusted when varying their magnification powers, within range limits.

Still another object is to provide improved zoom tube type magnifiers wherein the reduction in the number of doublets used in their design effectively eliminates the necessity for cementing elements, and thereby contributes to the economical manufacture of the magnifiers.

Still another object is to provide improved zoom tube type magnifiers which are adapted for use both with light tables and with other sources of light so that, for example, positive and negative photographic films and the like, can be viewed with them.

Other objects of the invention will in part be obvious and will in part appear hereinafter.

The above objectives are provided by means of a zoom tube type magnifier which includes, generally, eight lenses which are retained within a housing having means for adjustably positioning certain ones of said lenses with respect to one another in a fashion such as to provide a continuously variable 4.5—9 power magnifier. Three of the eight lenses of the magnifier have planosurfaces, and only one doublet is used, hence the magnifier can be easily and inexpensively manufactured. One of the lenses also is adapted to be adjustably positioned to focus the magnifier to accommodate the eye of the user and, once the magnifier is focused, it need not be readjusted when varying its magnification power between its 4.5—9 power range limit.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

FIG. 4 is a view illustrating the optical elements of the magnifier;

FIG. 5 is a sectional view taken substantially along lines 5–5 of FIG. 2;

FIG. 6 is a sectional view taken substantially along lines 6–6 of FIG. 2; and

FIG. 7 is a side plan view of the magnifier, generally illustrating the manner in which it is operated to vary its magnification power.

Similar reference characters refer to similar parts throughout the several views of the drawings.

Figure 1:
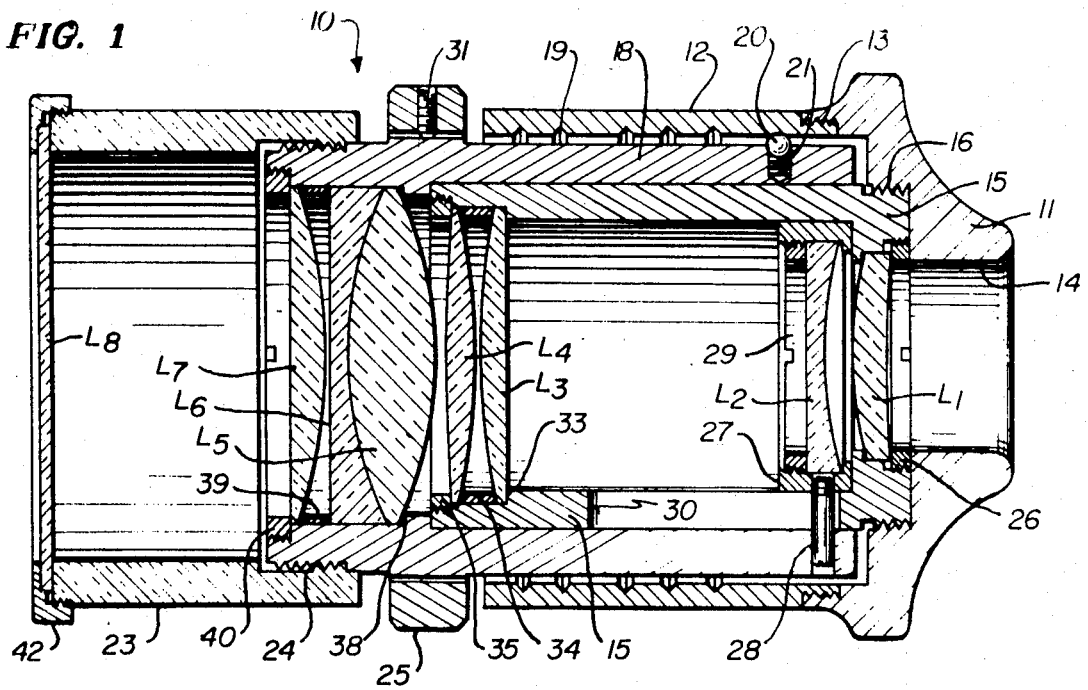
FIG. 1 is a sectional view taken longitudinally through the magnifier to illustrate its construction, the same being adjusted for 9 power magnification.
Figure 2:
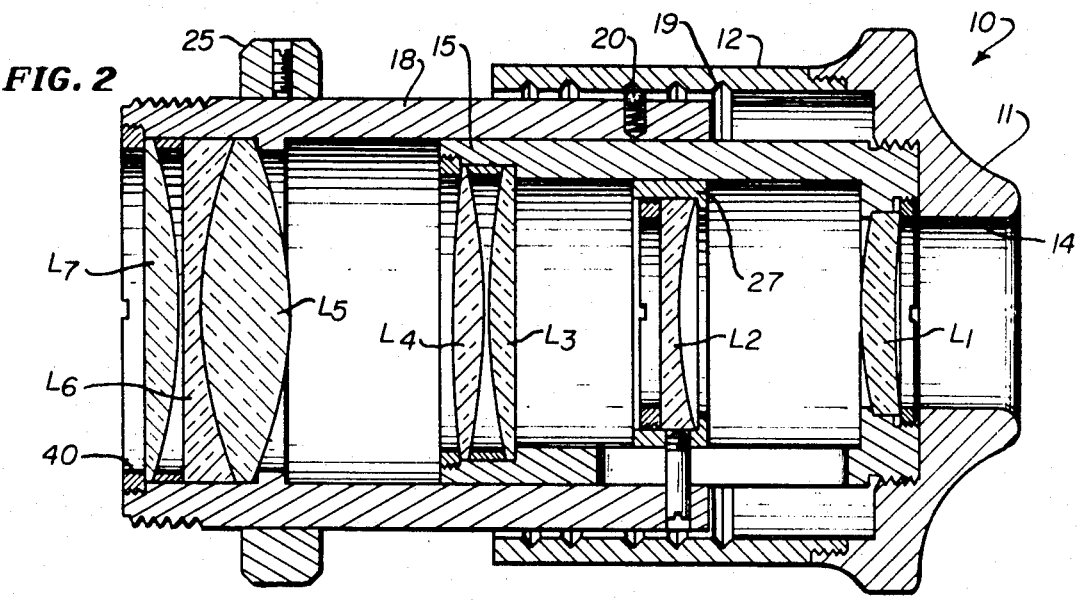
FIG. 2 is a similar sectional view like FIG. 1 illustrating the magnifier adjusted to its 4.5 power position with its transparent lens support and focus shield removed.
Figure 3:
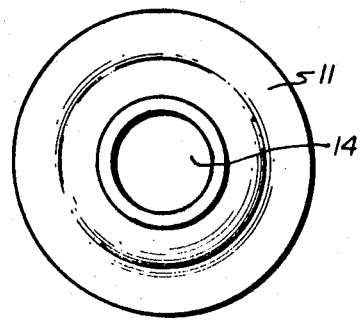
FIG. 3 is a plan view of the magnifier, as it appears from its eyepiece end.

Referring now to the drawings, in FIGS. 1 and 2 there is illustrated a zoom tube type magnifier 10 which is continuously variable from 4.5 power to 9 power magnification, with stop indexes at 4.5, 5, 6, 7, 8 and 9 powers. Each of these positions is clearly indicated on the barrel 18 of the magnifier 10, as can be best seen in FIG. 7. A transparent lens support and focus shield 23 supports the lens $L_8$ and is threadably affixed to the barrel 18 of the magnifier 10, in a fashion such that the magnifier 10 can be focused to accommodate the eye of the user, in a manner described more fully below. Once the magnifier 10 is focused, it need not be readjusted even though the magnification of the magnifier is varied.

More specifically, the magnifier 10 includes an eyepiece 11 having an aperture 14 in it. The eyepiece 11 is removably threadably affixed to a tubular shield and detent casing 12, by means of threads 13 and to a lens housing 15, by means of threads 16. The lens housing 15 is slidably and adjustably retained within the barrel 18 of the magnifier 10, and as can be best seen in FIGS. 1 and 2, the eyepiece 11, the tubular shield and detent casing 12, and the lens housing 15 all are simultaneously positionably adjusted with respect to the barrel 18. Adjustment of the magnifier 10 in each of the various different ranges of magnification is provided by means of a number of annular detent ring locks 19 formed within the interior peripheral surface of the tubular shield and detent casing 12 and three ball detents 20 (FIGS. 1, 2 and 6) positioned within cavities 21 formed in the barrel 18. As the eyepiece 11, the tubular shield and detent casing 12, and the lens housing 15 are positionably adjusted with respect to the barrel 18, the ball detents 20 seat within respective ones of the detent ring locks 19, as can be best seen in FIG. 2.

As indicated above, a transparent lens support and focus shield 23 is threadably affixed, by means of threads 24, to the barrel 18, in a fashion such that the shield 23 can be adjusted to focus the magnifier 10. A grip ring 25 which may have an annular, knurled surface on it also is fixedly secured to the barrel 18, by means of the setscrews 31. The grip ring 25 provides a gripping surface for holding the barrel 18 in a fixed position while adjusting the eyepiece 11, the tubular shield and detent casing 12, and the lens housing 15 to vary the magnification of the magnifier 10.

The magnifier 10, as can be best seen in FIGS. 1 and 4, includes only eight lenses $L_1$—$L_8$. Of these lenses, the lens $L_8$ is merely a flat, circular shaped piece of glass having two planosurfaces, with no magnification powers. The lens $L_8$ merely functions to seal the open end of the transparent lens support and focus shield 23, and accordingly, can be of very inexpensive material. The only doublet employed is the lenses $L_5$ and $L_6$, hence the necessity of precisely forming and cementing a large number of optical elements, as in the past, is substantially reduced, to a virtually irreducible minimum. Also, in addition to the lens $L_8$ which has two planosurfaces, the lenses $L_2$, $L_3$, $L_6$ and $L_7$ each have at least one planosurface, hence the employment of these lenses likewise inherently reduces product cost.

More specifically, as can be best seen in FIG. 4, the lenses $L_1$ and $L_5$ are borosilicate crown and dense barium crown lenses, respectively; the lenses $L_2$, $L_3$ and $L_6$ each are flint glass, dense barium crown and dense flint lenses, respectively; the lens $L_4$ is a dense barium crown lens; and the lens $L_7$ is a dense barium crown lens. The optical refractive index for the lenses $L_1$—$L_7$ are in accordance with the table below,

|  | $N_c$ | $N_d$, D–d | $N_t$ | $N_e$ | $\nu d$ |
|---|---|---|---|---|---|
| $L_1$ | 1.51385 | 1.51633 | 1.52191 | 1.52623 | 64.0 |
| $L_2$ | 1.61504 | 1.62004 | 1.63211 | 1.64206 | 36.3 |
| $L_3$ | 1.58619 | 1.58913 | 1.59581 | 1.60101 | 61.2 |
| $L_4$ | 1.58619 | 1.58913 | 1.59581 | 1.60101 | 61.2 |
| $L_5$ | 1.58619 | 1.58913 | 1.59581 | 1.60101 | 61.2 |
| $L_6$ | 1.72082 | 1.72825 | 1.74652 | 1.76206 | 28.3 |
| $L_7$ | 1.58619 | 1.58913 | 1.59581 | 1.60101 | 61.2 | wherein the refractive index $N_c$, $N_D$, $N_d$, $N_f$ and $N_g$ is measured at the following wavelength:

| Refractive Index | $N_c$ | $N_D$ | $N_d$ | $N_f$ | $N_g$ |
|---|---|---|---|---|---|
| Light source | Hydrogen | Sodium | Helium | Hydrogen | Mercury |
| Wave length (mu) | 656.3 | 589.3 | 587.6 | 486.1 | 435.8 | and the ABBE number $\nu d$ is calculated using the formula:

$$\nu d = \frac{N_d - 1}{N_f - N_c}$$

The characteristics and the relationship between lenses are set forth in the table below, wherein R is the radius of curvature of the various lenses, d is the axial spacing between elements or the axial thickness of the elements, and f is the focal length.

| | | |
|---|---|---|
| $L_1$ BK7 | $R_1 = -120$ mm. | $d_1 = 3.56$ mm. |
| | $R_2 = -42.58$ mm. | $d_2 =$ variable (4.56–29.04) mm. |
| $L_2$ F$_2$ | $R_3 = -27.3$ mm. | $d_3 = 2$ mm. |
| | $R_4 = -\infty$ mm. | $d_4 =$ variable (32.01–7.53) mm. |
| $L_3$ SK5 | $R_5 = -\infty$ mm. | $d_5 = 3.5$ mm. |
| | $R_6 = -63.79$ mm. | $d_6 = 0.4$ mm. |
| $L_4$ SK5 | $R_7 = +100$ mm. | $d_7 = 3.5$ mm. |
| | $R_8 = -210.5$ mm. | $d_8 =$ variable (1.06–25.54) mm. |
| $L_5$ SK5 | $R_9 = +50.0$ mm. | $d_9 = 9.7$ mm. |
| $L_6$ SF10 | $R_{10} = -40.0$ mm. | $d_{10} = 2$ mm. |
| | $R_{11} = -\infty$ mm. | $d_{11} = 0.5$ mm. |
| $L_7$ SK5 | $R_{12} = +60.0$ mm. | $d_{12} = 4$ mm. |
| | $R_{13} = +149.0$ mm. | $d_{13} = 31.44$ mm. |

The lenses $L_1$, $L_3$ and $L_4$ have a movement of 24.48 mm., hence the length $d_1$—$d_{13}$ is variable between approximately 98.23—122.71 mm. In addition, the lens $L_8$ is adjustable to focus the magnifier 10, and the length $d_1$—$d_{13}$ therefore is slightly greater than the indicated values, depending upon the degree to which the transparent lens support and focus shield 23 is threaded onto the barrel 18. The focal length and the axial spacings $d_2$, $d_4$ and $d_8$ at the various degrees of magnification are set forth in the following table.

| | $d_2$ | $d_4$ | $d_8$ |
|---|---|---|---|
| 4.5X $f=55.56$ | 29.04 | 7.53 | 25.54 |
| 5X $f=50$ | 25.33 | 12.24 | 21.83 |
| 6X $f=41.67$ | 19.02 | 17.55 | 15.52 |
| 7X $f=35.71$ | 13.64 | 22.93 | 10.14 |
| 8X $f=31.25$ | 8.88 | 27.69 | 5.38 |
| 9X $f=27.78$ | 4.56 | 32.01 | 1.06 |

The field of vision at the extreme limits of magnification, that is, at 4.5 power and at 9 power, are 13.4 mm. and 25 mm., respectively.

The magnifier may be easily assembled in the following manner. It will be apparent, however, that it can as well be assembled by varying several of these described steps. The lens $L_2$ first is mounted within the lens mount 27, by means of the lens ring mount 29. It may be noted that the planosurface of the lens $L_2$ is disposed to face to the left as is illustrated in FIG. 1. The lens mount 27 then is slidably positioned within the lens housing 15 by, for example, standing the latter on end and slidably dropping the lens mount 27 into it. Next, the lens $L_3$ is seated within the lens housing 15, with its planosurface abutted against the shoulders 33 of the lens cavity formed in the lens housing. A ring-shaped spacer 34 next is placed in the lens cavity in the lens housing 15, with its one edge abutting against the concave surface of the lens $L_3$. The lens $L_4$ next is seated within the lens cavity, with its surface having the greatest radius abutted against the spacer 34, and a lens ring mount 35 is threadably affixed to lens housing 15, to fixedly retain the lenses $L_3$ and $L_4$ and the spacer 34 within the lens housing 15.

Next, the lens housing 15 is slidably disposed within the barrel 18 and is adjustably positioned so that the three elongated lots 30 (FIGS. 1, 2 and 5) are aligned to receive the three securement pins 28 which are extended through apertures within the barrel 18 and threadably received within threaded apertures in the lens mount 27, as can be best seen in FIG. 2. The elongated slots 30 permit the eyepiece 11, the tubular shield and detent casing 12, and the lens housing 15 to be slidably positionably adjusted with respect to the lens mount 27, or more specifically, the lens $L_2$.

The lens $L_1$ can now be fixed within the upper end (the right end as illustrated) of the lens housing 15, by means of the lens ring mount 26. The doublet comprising the lenses $L_5$ and $L_6$ are seated within the lens cavity in the lower end of the barrel 18, with the radius of the lens $L_5$ abutted against the shoulder 38 and with the planosurface of the lens $L_6$ facing to the bottom (to the left as illustrated) of the barrel 18. An annular spacer 39 is placed within the lens cavity and abutted against the planosurface of the lens $L_6$, prior to seating the lens $L_7$ within the same lens cavity. The lenses L, $L_6$ and $L_7$ and the spacer 39 all are retained within the lens cavity by means of the lens ring mount 40 which is threadably received within the barrel 18.

With all of the lenses assembled within the lens housing 15 and the barrel 18 in the described fashion, the tubular shield and detent casing 12 is telescoped about the barrel 18. The ball detents 20 and their associated springs, of course, are inserted within the cavities 21 in the barrel 18, before the tubular shield and detent casing 12 is telescoped about the barrel. The eyepiece 11 now is simultaneously threadedly affixed to both the tubular shield and detent casing 12 and the lens housing 15. The assembly of the magnifier 10 is completed by affixing the lens $L_8$ to the open end of the transparent lens support and focus shield 23, by means of the lens ring mount 42, and the transparent lens support and focus shield 23 threadably affixed to the barrel 18.

In using the zoom tube type magnifier 10, it is positioned on an object such as a negative or positive photographic film. In the case of a negative, the latter can be secured to a light table to provide a source of light for viewing it. The transparent lens support and focus shield 23 permits the magnifier 10 to be used with the positive photographic film since a source of illumination can be directed through the transparent shield 23 onto the positive photographic film in order to illuminate the latter. The magnifier 10 is focused to accommodate the eye of the user, by threadably adjusting the transparent lens support and focus shield 23 to adjustably position the distance between the lens $L_8$ and the barrel 18. The arrangement of the transparent lens support and focus shield 23 is such that once the magnifier 10 is focused to accommodate the eye of the user, the magnifier need not be readjusted when varying its magnification powers between its 4.5 to 9 power range limit.

To vary the magnification of the magnifier 10, the grip ring 25 is gripped with the fingers of one hand and the tubular shield and detent casing 12 gripped with the fingers of the other hand and the latter raised or lowered with respect to the barrel 18, as generally illustrated in FIGS. 2 and 7. The tubular shield and detent casing 12 has a notch 43 (FIG. 7) formed in it which is operatively related to the indicia on the barrel 18 of the magnifier representing the various range or power positions so that the user can readily determine the power of the magnifier 10, at any particular position. As can be best seen in FIG. 2, when the magnifier 10 is adjusted in the above-described fashion, the lenses $L_1$, $L_3$ and $L_4$ all are adjustably positioned with respect to the lenses $L_2$, $L_5$, $L_6$ and $L_7$. It may be further noted that the lens $L_2$ remains fixed with respect to the lenses $L_5$, $L_6$, and $L_7$ and is disposed between the lens $L_1$ and the lenses $L_3$ and $L_4$. With this construction, it is found that the clarity of the image is substantially improved over similar, comparable magnifiers and that the magnifier, furthermore, is far simpler to use. This is partially due to the fact that it is easily focused to accommodate the eye of the user, simply by threadably adjusting the transparent lens support and focus shield 23 and, once adjusted, the magnifier need not be refocused even though its power is thereafter varied. It can further be seen that the magnifier employs no more and, in most cases, fewer optical elements than available, similar, comparable magnifiers and the employment of a number of planosurfaces inherently reduces its costs. The face that the magnifier is adapted for use both with light tables and with other sources of light so that, for example, positive and negative photographic films and the like can be viewed with it also greatly increases its versatility and its ultimate value to the purchaser.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what we claim as new and desired to be secured by Letters Patent is:

1. A zoom tube-type magnifier made substantially according to the following table:

| Lens | Radii | $d$ |
|---|---|---|
| $L_1$ | $R_1 = -120$ | $d_1 = 3.56$ |
|  | $R_2 = -42.58$ | $d_2 =$ variable (4.56–29.04) |
| $L_2$ | $R_3 = -27.3$ | $d_3 = 2$ |
|  | $R_4 = -$plano | $d_4 =$ variable (32.01–7.53) |
| $L_3$ | $R_5 = -$plano | $d_5 = 3.5$ |
|  | $R_6 = -63.79$ | $d_6 = 0.4$ |
| $L_4$ | $R_7 = \pm 100$ | $d_7 = 3.5$ |
|  | $R_8 = -210.5$ | $d_8 =$ variable (1.06–25.54) |
| $L_5$ | $R_9 = \pm 50.0$ | $d_9 = 9.7$ |
| $L_6$ | $R_{10} = -40.0$ | $d_{10} = 2$ |
|  | $R_{11} = -$plano | $d_{11} = 0.5$ |
| $L_7$ | $R_{12} = \pm 60.0$ | $d_{12} = 4$ |
|  | $R_{13} = 149.0$ | $d_{13} = 31.44$ | where the lens elements are numbered from front to rear in the first column, the radius of curvature R of the lens elements are given in the second column and the spaces between or the thickness of the lens elements $d$ are given in the third column.

2. The zoom tube-type magnifier of claim 1, wherein the characteristics set forth in the following table hold substantially true at the various powers of magnification:

|  | Focal length | $d_2$ | $d_4$ | $d_8$ |
|---|---|---|---|---|
| Power: |  |  |  |  |
| 4.5 | 55.56 | 29.04 | 7.53 | 25.54 |
| 5 | 50 | 25.33 | 12.24 | 21.83 |
| 6 | 41.67 | 19.02 | 17.55 | 15.52 |
| 7 | 35.71 | 13.64 | 22.93 | 10.14 |
| 8 | 31.25 | 8.88 | 27.69 | 5.38 |
| 9 | 27.78 | 4.56 | 32.01 | 1.06 |

3. A zoom tube-type magnifier comprising: a barrel; a tubular shield and detent casing disposed about and slidably positionably adjustable with respect to said barrel; a lens housing having elongated slot means disposed within and slidably positionably adjustable with respect to said barrel; and eyepiece having an aperture in it fixedly secured to both said tubular shield and detent casing and said lens housing; said lens housing having first and second lens assemblies affixed to the front and rear ends thereof, respectively; a third lens assembly; said third lens assembly being affixed to said barrel by securement pin means extending through said elongated slot means in said lens housing and slidably disposed within said lens housing between said first and second lens assemblies therein; said barrel further having another lens assembly affixed within it at the rear end thereof; and a tubular shield affixed to said barrel at the rear end thereof for support of said magnifier in a fashion such that said other lens assembly affixed within said barrel at the rear end thereof is spaced a predetermined fixed distance from an object upon which said magnifier is seated.

4. The zoom tube-type magnifier of claim 3, wherein said shield is adjustably threadably affixed to said barrel and is adjustably positionable to focus said magnifier.

5. The zoom tube-type magnifier of claim 4, wherein the end of said shield has a lens affixed to it to close the open end thereof.

6. The zoom tube-type magnifier of claim 3 wherein said barrel and said tubular shield and detent casing have a ball detent and annular detent grooves in them, respectively, for providing stop indices at various ones of the magnification powers of said magnifier.

7. The zoom tube-type magnifier of claim 6, further including indexing indicia on said barrel functionally related to the adjusted position of said tubular shield and detent casing for indicating the adjusted magnification power of said magnifier.

8. The zoom tube-type magnifier of claim 3, wherein the lenses disposed within said magnifier are numbered $L_1$–$L_7$ from the front to the rear thereof, respectively, and said lenses are made substantially according to the following table:

| Lens | Radii | $d$ |
|---|---|---|
| $L_1$ | $R_1 = -120$ | $d_1 = 3.56$ |
|  | $R_2 = -42.58$ | $d_2 =$ variable (4.56–29.04) |
| $L_2$ | $R_3 = -27.3$ | $d_3 = 2$ |
|  | $R_4 = -$plano | $d_4 =$ variable (32.01–7.53) |
| $L_3$ | $R_5 = -$plano | $d_5 = 3.5$ |
|  | $R_6 = -63.79$ | $d_6 = 0.4$ |
| $L_4$ | $R_7 = \pm 100$ | $d_7 = 3.5$ |
|  | $R_8 = -210.5$ | $d_8 =$ variable (1.06–25.54) |
| $L_5$ | $R_9 = \pm 50.0$ | $d_9 = 9.7$ |
| $L_6$ | $R_{10} = -40.0$ | $d_{10} = 2$ |
|  | $R_{11} = -$plano | $d_{11} = 0.5$ |
| $L_7$ | $R_{12} = \pm 60.0$ | $d_{12} = 4$ |
|  | $R_{13} = 149.0$ | $d_{13} = 31.44$ |

9. The zoom tube-type magnifier of claim 8, wherein the characteristics set forth in the following table hold substantially true at the various powers of magnification:

|  | Focal length | $d_2$ | $d_4$ | $d_8$ |
|---|---|---|---|---|
| Power: |  |  |  |  |
| 4.5 | 55.56 | 29.04 | 7.53 | 25.54 |
| 5 | 50 | 25.33 | 12.24 | 21.83 |
| 6 | 41.67 | 19.02 | 17.55 | 15.52 |
| 7 | 35.71 | 13.64 | 22.93 | 10.14 |
| 8 | 31.25 | 8.88 | 27.69 | 5.38 |
| 9 | 27.78 | 4.56 | 32.01 | 1.06 |